United States Patent [19]
Franz

[11] 3,894,883
[45] July 15, 1975

[54] METHOD AND APPARATUS UTILIZING AN ANGLED CROSSFIRE RINSE SYSTEM

[75] Inventor: Helmut Franz, Pittsburgh, Pa.
[73] Assignee: PPG Industries, Inc., Pittsburgh, Pa.
[22] Filed: Aug. 9, 1973
[21] Appl. No.: 386,897

Related U.S. Application Data
[62] Division of Ser. No. 159,746, July 6, 1971, Pat. No. 3,793,054.

[52] U.S. Cl. .................... 134/15; 134/36; 134/122
[51] Int. Cl. .............................................. B08b 3/02
[58] Field of Search ............. 134/15, 32, 36, 64, 72, 134/122, 129, 131, 144, 151, 172, 83, 199; 117/47 R, 54, 66, 105.3, 124 C; 118/73, 314, 323

[56] References Cited
UNITED STATES PATENTS

| | | | |
|---|---|---|---|
| 2,815,298 | 12/1957 | Heffley | 117/105.3 X |
| 2,996,406 | 8/1961 | Weinrich | 117/105.3 X |
| 3,543,775 | 12/1970 | Bodnar | 134/64 |
| 3,723,155 | 3/1973 | Greenberg et al. | 117/54 |
| 3,723,158 | 3/1973 | Miller | 117/54 X |
| 3,761,305 | 9/1973 | Franz | 117/105.3 |

FOREIGN PATENTS OR APPLICATIONS
862,574   3/1961   United Kingdom............. 117/54

*Primary Examiner*—S. Leon Bashore
*Assistant Examiner*—Richard V. Fisher
*Attorney, Agent, or Firm*—Donald Carl Lepiane

[57] ABSTRACT

A reciprocating crossfire set of rinsing nozzles rinses the surface of a glass sheet while maintaining a uniform thickness of rinsing medium in an area on the glass surface where a subsequent spraying operation is to be carried out. The rinsing nozzles are angled obliquely downward, rearward and outward, and rinse water or other medium is supplied at a rate sufficient to force excess rinsing medium off the side and the trailing edge of the sheet, rather than being delivered into the spray area or accumulated along its trailing edge portion. The uniform thickness of rinsing medium prepares the substrate for receiving a more uniform transparent metal-boron coating in the spraying operation that follows.

4 Claims, 13 Drawing Figures

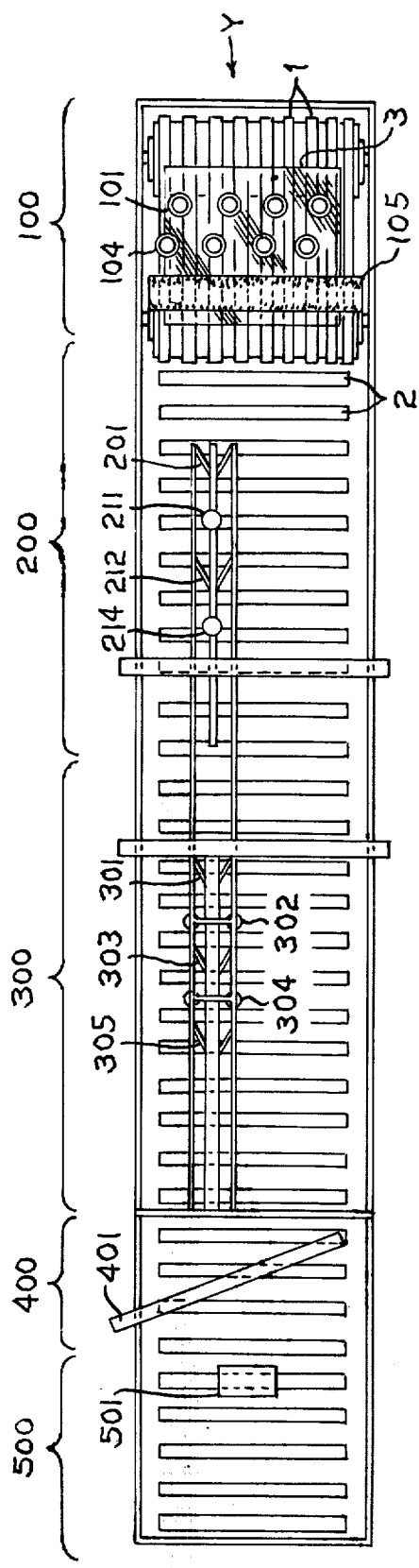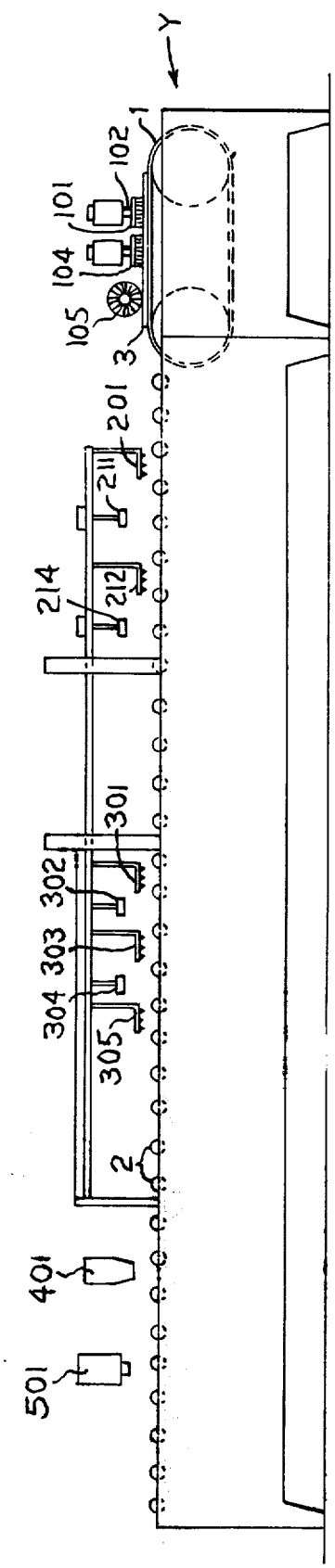
FIG. 1
FIG. 2

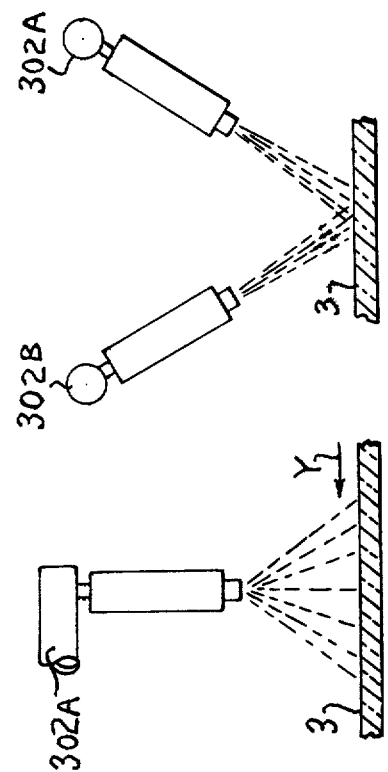
FIG. 10
FIG. 9
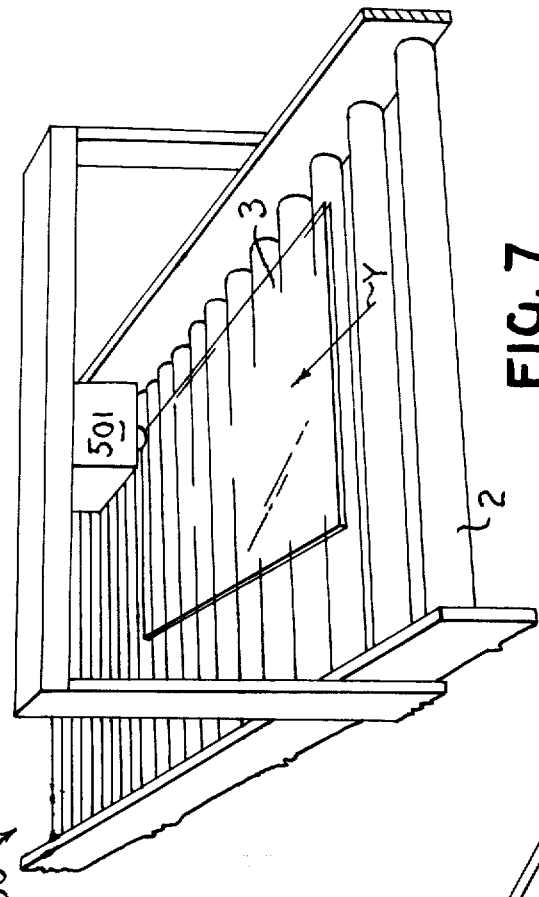
FIG. 7
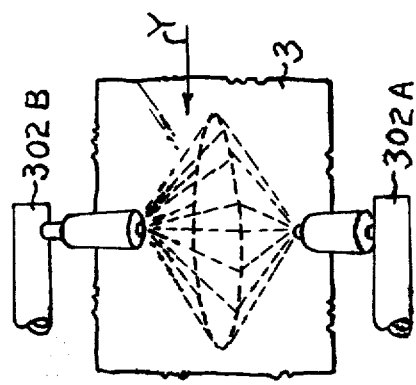
FIG. 8
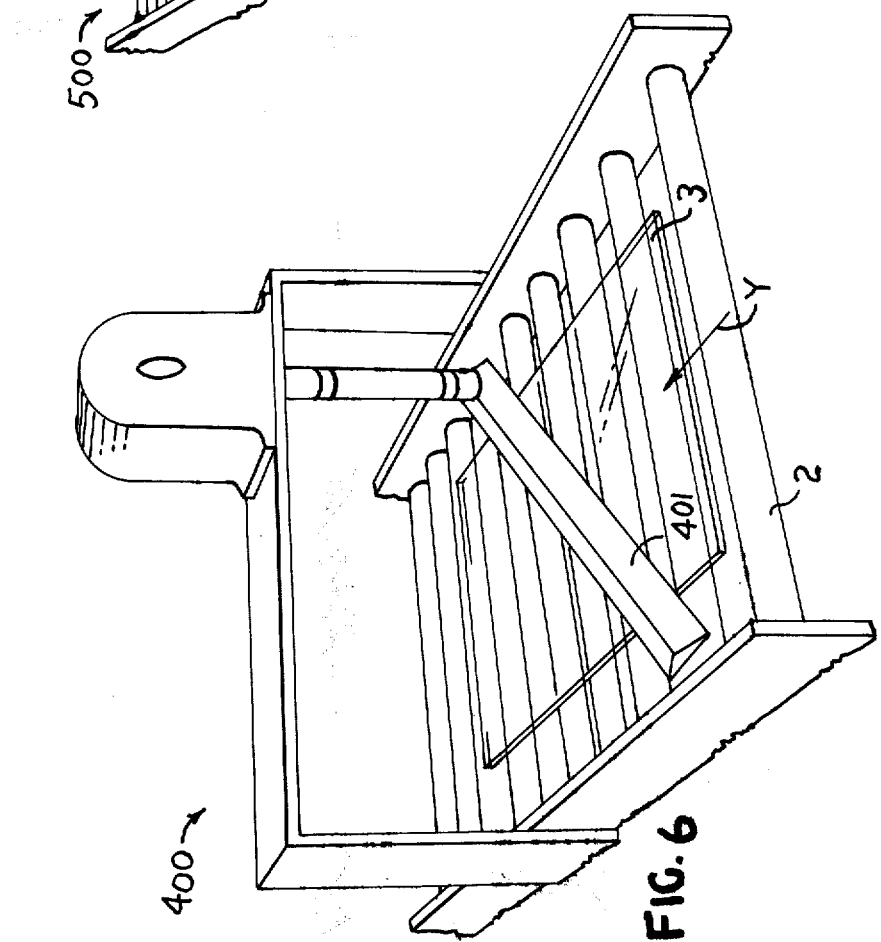
FIG. 6

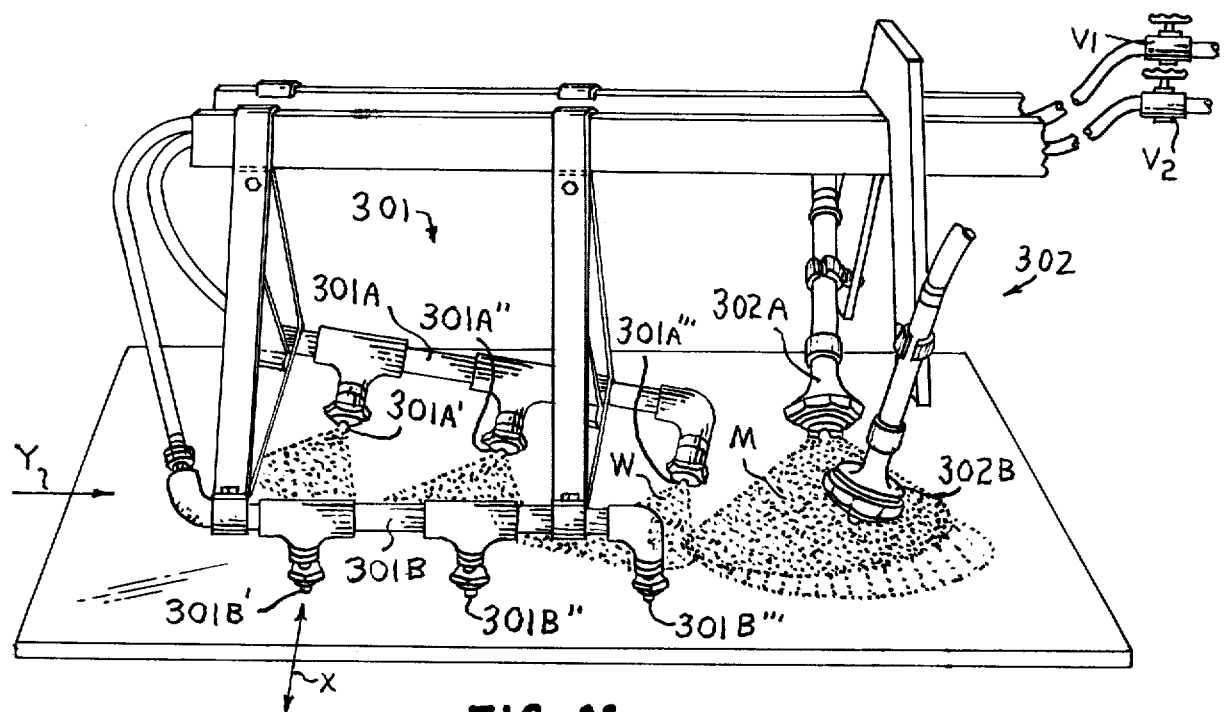
FIG. 11
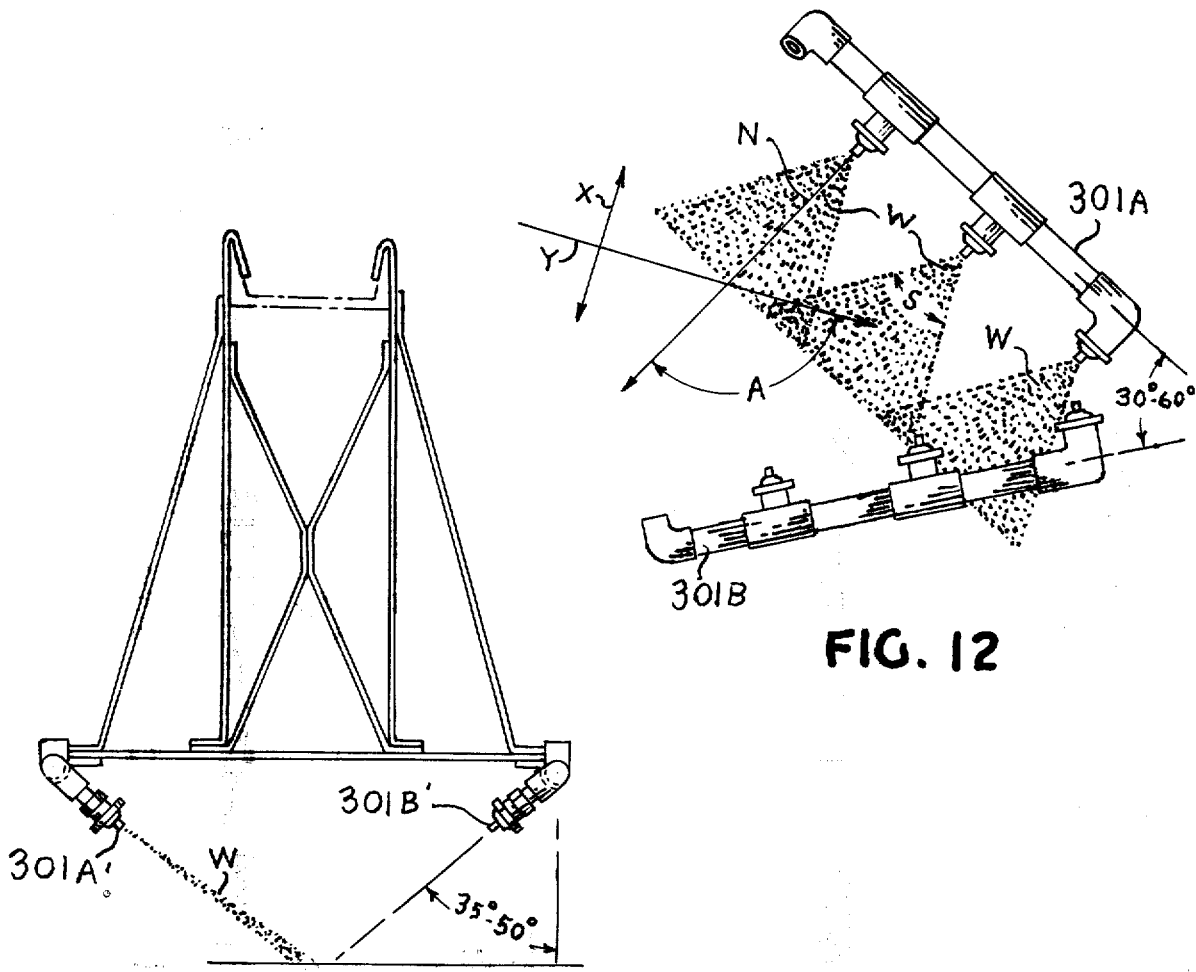
FIG. 12
FIG. 13

METHOD AND APPARATUS UTILIZING AN ANGLED CROSSFIRE RINSE SYSTEM

This is a division of application Ser. No. 159,746, filed July 6, 1971, now U.S. Pat. No. 3,793,054.

CROSS REFERENCES TO RELATED APPLICATIONS

This application is related to U.S. patent application Ser. No. 829,705, filed in the names of Richard G. Miller et al. on June 2, 1969, and entitled "Electroless Process for Forming Thin Metal Films", now U.S. Pat. 3,671,291. This application is also related to U.S patent application Ser. No. 829,755, filed on June 2, 1969, in the name of Richard G. Miller, and entitled "Electroless Process for Forming Thin Metal Films", now U.S. Pat. No. 3,672,939. This application is also related to U.S. patent applications Ser. Nos. 57,451 and 57,754, filed on July 23, 1970, in the name of Richard G. Miller, and entitled "Wet Chemical Method for Producing Transparent Metal Films", and "Solution for Depositing Transparent Metal Films", now U.S Pat. Nos. 3,723,158 and 3,674,517, respectively. This application is also related to U.S. Patent application Ser. No. 57,575 filed on July 23, 1970, in the name of Richard E. Miller and entitled "Solutions for Depositing Transparent Metal Films" which application has since been abandoned. This application is also related to U.S. patent application Ser. No. 57,527 of Charles B. Greenberg et al., filed on July 23, 1970, for "Wet Chemical Method for Producing Transparent Metal Films", now U.S. Pat. No. 3,723,155. This application is also related to U.S. patent application Ser. No. 111,904, filed on Feb. 2, 1971, in the name of Helmut Franz et al. and entitled "Chemical Filming Solution and Process for Plating Therewith". This application is also related to U.S. patent application Ser. No. 130,468, filed on Apr. 1, 1971, in the name of Helmut Franz, and entitled "Removal of Metal Containing Deposits from Non-Metallic Substrates" now U.S. Pat. No. 3,758,867. This application is also related to Ser. No. 386,896, filed even date herewith, which is also a division of application Ser. No. 159,746, now U.S. Pat. No. 3,793,054.

BACKGROUND OF THE INVENTION

1. Field of the Invention

This invention relates to a method and an apparatus for providing non-conductive transparent substrates with transparent coatings having optical properties of good uniformity, and particularly relates to a glass rinsing operation that avoids sources of non-uniformity of said optical properties.

2. Description of the Prior Art

In the past, transparent metal coated glass articles have been produced by various vapor deposition techniques which generally involve the deposition, from the vapor phase, of substantially pure metals, such as nickel or chromium on a prepared glass substrate. However, while such techniques are generally capable of providing metal films of acceptably uniform thickness and specified visual transparency, commercial films of this type have been observed to possess an undesirably high number of visible pin-holes. Further, this process is expensive and complex. Metal coated metallic and non-metallic articles have been produced by various well-known electroless or chemical plating techniques. These techniques generally involve the immersion of a metallic article or a sensitized non-metallic article into a suitable electroless plating bath comprising an aqueous medium having dissolved therein a metal salt and an appropriate reducing agent, whereupon a metal film is deposited upon the immersed article by an autocatalytic mechanism.

The electroless process is an old and established one. For example, Brenner and Riddell disclosed in 1944 that an opaque coating of nickel could be autocatalytically deposited upon metallic substrates by imemrsing the substrates into a nickel salt solution containing sodium hypophosphite. U.S. Pat. Nos. 2,532,283 and 2,532,284 were issued to Brenner and Riddell upon their discoveries. The use of sodium hypophosphite as the reducing agent results in deposits which are not pure metal, but which contain about 2 to 10 percent elemental phosphorous by weight. In this connection, it is known that the presence of phosphorous in a deposited nickel film affects certain of the film characteristics, including its dominant wave lengths, infrared absorption characteristics, excitation purity and electroconductivity. In addition, and for reasons not wholly understood, it has been found that the uniformity of deposited nickel-phosphorous films generally decreases rapidly with increased thickness when the thickness of the coated glass substrates is greater than about 3/16 of an inch.

Other electroless immersion plating processes involve the use of boron-containing reducing agents which are effective at room temperature. U.S. Pat. Nos. 2,968,578, 3,140,188, 3,096,182 and 3,045,334 are representative of improved electroless plating processes of this type. U.S. Pat. No. 2,956,600, issued to Carlson et al., describes a spraying process wherein two separate solutions are sprayed upon substrates to form nickel coatings. This process uses sodium hydrosulfite and sodium hypophosphite as a reducing agent.

To a large extent the prior art has been concerned with production of opaque coatings by electroless coating, although it is understood that the assignee of U.S. Pat. No. 2,702,253 produces a glass plate having a transparent nickel coating possibly by the process therein disclosed. The problem of producing transparent glass or like articles is much more difficult because relatively minute variations in thickness are readily visible to the naked eye as unsightly defects. Other variations in such coatings can provide streaks with a glass region appearing almost opaque due to reflection of light in an otherwise transparent glass plate.

Many solutions suggested by the prior art develop a coating of gradually increasing thickness well beyond thicknesses which are opaque. The production of uniform transparent films with such solutions is especially difficult.

U.S. Application Ser. No. 57,451, now U.S. Pat. No. 3,723,158, filed on July 23, 1970, in the name of Richard G. Miller, teaches a method whereby transparent substrates such as glass are provided with a uniform transparent coating by contacting the glass simultaneously with a mixture of a reducible metal salt in a solution and a reducing agent, which mixture becomes rapidly depleted of its film forming capacity before the resulting coating becomes opaque. This produces a uniform coating at a rate which is relatively rapid and then relatively slower and which effectively ceases to produce coating while the coating remains transparent. According to said application, it has been found that by using such mixtures and discontinuing the contact therewith after the rate of deposition of coating has reached the slower rate, transparent films of improved uniformity with few pin-holes can be achieved. The application further states that coatings of the best uniformity may be obtained even with large plates having 4 or more square feet of surface when the coating is applied by separately spraying a solution of reducing agent and a solution of the reducible metal salt on the glass plate preferably while the major surfaces thereof are in a horizontal or substantially horizontal plane. The process has been found to be effective over a broad temperature range for coating any of the so-called catalytic metal substrates or non-catalytic substrates sensitized in a conventional manner to promote deposition of continuous, adherent transparent metal films. An advantage of the process is that it will deposit highly uniform transparent films when performed at about room temperature, i.e., from about 20° C to about 30° C. The application further states that in order to insure that each of a plurality of substrates is provided with a coating that exhibits substantially the same physical and chemical characteristics, it is advantageous that the process temperature be held constant to within about ± 1° C, for example, over 100 substrates or over 1000 square feet of substrates, or the like. Best uniformity and appearance of transparent films is achieved when films are deposited to a thickness having a luminous transmission of about 35 to 40 percent or less, and when the films comprise nickel-boron, cobalt-boron, iron-boron, and the like. Films comprising mixtures of boron and nickel, cobalt and/or iron may also be provided. In all such films, the boron is present in a minor amount (rarely exceeding about 15 percent by weight and normally between about 2 and 7 percent by weight) while the metal (nickel, cobalt and/or iron) is present in preponderant amounts (rarely less than 85 percent by weight and normally between about 93 and 98 percent by weight).

The transparent substrates obtained in accordance with the last-mentioned process may be employed, for example, as transparent windows or outside walls in a building such as a skyscraper or other multistory structure. These substrates may be especially advantageously employed as one of the plates which make up multiglazed units as described in the previously mentioned U.S. patent application Ser. No. 57,575. It will be understood that uniformity of coating in such uses is especially important because otherwise the reflected color portions of the building differs sharply from that of other portions, thus distracting from its appearance.

To generalize, the prior art teaches a process whereby glass plates are conveyed along an article movement path through a sequence of rinse and spray stations. After a plate leaves a rinse station, it is normally covered with a layer of water. When the plate enters a spray station, this layer of water is normally pushed toward the trailing edge of the plate and tends to accumulate toward the trailing edge. As more water accumulates at the trailing edge, the water tends to flow back into the spray zone. The problem is especially severe at the trailing edge where water is retained by the edge of the plate. After reaching equilibrium thickness at the trailing edge, some of the water flows back into the spraying zone so that the glass plate is sprayed while it is covered with one or more puddles of water of non-uniform thickness. As a result, there is an uneven dilution of the sprayed-on solutions in the sensitizing and coating stations, and this causes the coating on the plate to vary in thickness, in absorption and in reflectance. This is extremely pronounced adjacent to the trailing edge of the plate. In addition, a finger-like front of the sprayed-on solution forms between each spray station and each rinse station which manifests itself in streaks in the direction of travel of the plate. In addition, splashing in the sensitized area causes streaks and mottle in the coating. The prior art recognized the exsitence of the problem of non-uniformity of coating, but failed to associate its relation to an inferior rinsing technique.

In U.S. patent application Ser. No. 159,747, filed on July 6, 1971, in the name of the present inventor, now U.S. Pat. No. 3,761,305, there is disclosed a solution to this problem. In the said mentioned application, there is suggested the use of a squeegee/shield combination ahead of the spray station to insure that there are no puddles or finger-like fronts of rinse water at a spray station. The squeegee is made of soft rubber or plastic, and it prevents the formation of finger-like fronts and also protects the glass surface from splashing and defects associated wtih splashing. While this is an advance over the prior art, the squeegee is not an ideal solution to the problem in that there is always a chance of damaging the sensitization and activation layers when solid particles that may become trapped between the glass and the squeegee or in the squeegee material itself abrade said layers.

SUMMARY OF THE INVENTION

According to the present invention, the above-mentioned problems are solved by installing reciprocating angled crossfire rinse sets at the rinse stations downstream of the spray stations. The angled crossfire rinse sets have pipes with nozzles that are obliquely angled to impart rinsing medium at an oblique angle both with respect to an article movement path and a reciprocating path of said rinse sets to provide a component of motion parallel to the upper glass surface of sufficient magnitude to avoid puddling or other non-uniform thickness variations in the rinse medium on the glass surface. The rinse sets may be mounted on the same boom as the spray guns to reciprocate in unison, according to the preferred embodiment.

As used in this application, the phrase "article movement path" refers to the path formed by the relative movement of a work piece with respect to a rinse set and/or a spray set. The phrase includes both the situation where the rinse set is stationary relative to said path and the work piece moves past the rinse set, and where the work piece is stationary relative to said path and the rinse set moves past the work piece. The direction of the article movement path is such that the trailing edge of the glass sheet is the last increment of glass to be rinsed. The article movement path is defined in a manner independent of the presence or absence of any reciprocating movement of the rinse set.

The direction of reciprocating movement of the rinse set as it traverses the work piece is referred to in this application as the "reciprocating path" or the "rinse set reciprocating path". This latter path is transverse to and is defined in a manner independent of the presence or absence of the article movement path.

The term "nozzle axis", as used in this application, refers to the direction in which the rinse set nozzles extend. This direction is defined in a manner independent of the presence or absence of either or both the article movement path and the rinse set reciprocating path.

It is important to note that the relative movement of the glass sheet with respect to any particular rinse nozzle is very complex, insofar as direction is concerned, in that the glass sheet travels in a first direction along an article movement path in one plane while the rinse nozzle travels in a transverse direction along a reciprocating path in another plane. It is for this reason that this application describes each movement independently.

The glass sheet moves along the article movement path in a given plane, usually horizontal for the preferred embodiment. The crossfire rinse set travels along the reciprocating axis in a plane that is parallel to the given plane but spaced therefrom in the preferred embodiment.

In a preferred embodiment, each rinse set contains two pipes and each pipe contains a plurality of nozzles. Each nozzle emits a fan-like spray having an apex angle of about 50° to about 75°, and preferably about 60°. The pipes are positioned so that an angle formed between the pipes of each set is between about 15° and about 100°, and preferably between about 30° and about 60°. Nozzles extend perpendicularly from each pipe in such an arrangement that there is preferably an angle ranging from about 105° to about 120° formed between an axis subtended by each nozzle axis in the plane of the article movement path and the axis of the article movement path. If the angle between the nozzle axis and the article movement path is smaller than the preferred range, too much rinse water is delivered into the spray area. If the nozzle angle is larger than the preferred range, a heavy build up of liquids at the trailing edge of the plate results. The present invention associates this heavy build-up with non-uniform coating. Therefore, it proposes to avoid this build-up by sweeping the water or spent solution over the side of the plate.

The crossfire rinse nozzles should be installed so that they are offset from the vertical axis by about 35° to about 50°. If this angle is less than about 35°, it is possible to damage a previous sensitization layer or a previous metal-boron coating due to the stronger impact of the rinse. In addition, smaller angles also provide a minimized sweeping action and this is undesirable. If this angle is greater than about 50°, the rinse becomes more superficial and less effective.

Broadly, the invention includes moving a transparent substrate along an article movement path in a given plane, usually horizontal, while a rinse set is moved along a reciprocating axis transverse to the article movement path in a plane parallel to the given plane and spaced therefrom. Each nozzle axis extends downwardly, rearwardly and outwardly so that it forms an oblique angle with the article movement path, the reciprocating axis and an axis perpendicular to the given plane (a vertical axis if the given plane is horizontal).

According to the present invention, the presence of excessive or uneven amounts of rinsing medium in the spray area is avoided while the main rinsing action still acts to move the water layer or the spent solution together with splashed material over the side and the trailing edge of the plate. This prevents the formation of finger-like fronts ahead of the sprays.

The distance between an angled crossfire rinse set and a subsequent spray gun depends upon the shape of the spray. Ideally, the edge of the rinse fan should just touch the edge of the spray fan. Sicne it is impractical to work with this precision, the edge of the spray fan is normally adjusted so that it slightly overlaps the edge of the rinse fan. This does not harm the quality of the coating produced.

Coated glass, made in accordance with the present invention, is capable of inhibiting transfer of radiant heat such as that from the sun's rays by the light reflectance and absorption of the film and the fact that it permits transmittance of less than 35 to 40 percent of visible light from sunlight. Panels having light transmittance of 5 to 25 percent are especially useful in warm to temperate climates such as the United States. In other climates such as Northern Europe, panels of greater transmittance are preferred.

The color of the panels is dependent upon the metal which is reduced. Especially attractive nickel-boron and like metal-boron coatings which have a neutral color reflecting and passing essentially white light are provided according to this invention. Cobalt coatings are blue while iron coatings are brown. Other colors can be obtained by producing mixtures of these coatings.

The nickel boron and metal boron compounds herein contemplated are usually electroconductive. Thus, these films may be used as heating elements. For example, in the double-glazed panel comprising two-spaced glass panels enclosed by a glass, metal or organic sealing around the edge of the panel one such panel may be coated on its interior side by the process of this invention. By applying an electromotive force across this coating, heat may be generated in the panel, thus minimizing or preventing substantial heat loss from the interior of the building in which such panels are mounted.

Coatings having one or more of the desirable properties set forth above are effectively produced according to this invention by spraying as hereinafter disclosed in greater detail. Such a process is especially valuable in producing uniform coatings on large articles such as plates of glass or other substrates having one dimension in excess of 3 feet, with the other being in excess of 1.5 feet, for example, panels of 3 feet by 6 feet or larger.

Immersion processes have serious disadvantages. These disadvantages are especially acute where transparent coatings are desired since, for example, the composition of the plating bath changes during use, thereby requiring frequent chemical analysis and addition of materials to maintain a constant bath composition. If a constant bath composition is not maintained the metal films formed thereon will not be uniform. In this latter connection, it should be appreciated that contamination of a bath composition, which may be caused, for example, by an inadvertent admixture therewith of the solutions employed to activate the glass being coated or necessitate a complete shut down of the process and a renewal of the bath. Furthermore, immersion processes are not especially adaptable to forming transparent films inasmuch as the rate of deposition is difficult to control. Thus it is relatively common for a heavier coating to be deposited on that portion of the substrate which is first to enter and last to leave the plating bath.

Spraying a coating avoided the tapered coating thickness associated with dip coating in a plating bath. However, prior to the present invention the non-uniformity of appearance of transparent coatings in some frequency made it necessary to improve the coating operation.

DESCRIPTION OF THE DRAWINGS

A complete understanding of the invention may be obtained from the foregoing recital of the prior art and following description of an illustrative embodiment of the present invention, taken together with the appended drawings, in which:

FIG. 1 is a diagrammatic top plan view, with portions removed for the sake of clarity, of an apparatus suitable for carrying out the process of the present invention on a continual basis;

FIG. 2 is a diagrammatic front elevation of the apparatus of FIG. 1;

FIG. 6 is a diagrammatic partial perspective view of a drying section in the apparatus of FIG. 1;

FIG. 7 is a diagrammatic partial perspective view of a film density measuring and unloading section included in the apparatus of FIG. 1;

FIG. 8 is a diagrammatic top plane view of a metal solution-reducing solution dispensing spray gun set of a metal-boron deposition coating section of the apparatus of FIG. 1, illustrating the disposition of spray guns in said set relative to each other and to an advancing glass substrate, and illustrating a fan-shaped pattern assumed by the respective solutions being sprayed;

FIG. 9 is a diagrammatic side elevational view of the coating apparatus illustrated in FIG. 8;

FIG. 10 is a diagrammatic front elevational view of the apparatus illustrated in FIG. 8;

FIG. 11 is a perspective view showing the details of an angled crossfire rinse gun set and a metal-boron spray gun set;

FIG. 12 is a top plan view, with portions removed for the sake of clarity of the rinse gun set of FIG. 11; and FIG. 13 is an end elevational view, with portions removed for the sake of clarity of the rinse gun set illustrated in FIG. 11.

DESCRIPTION OF THE PREFERRED EMBODIMENT

Figure 3:
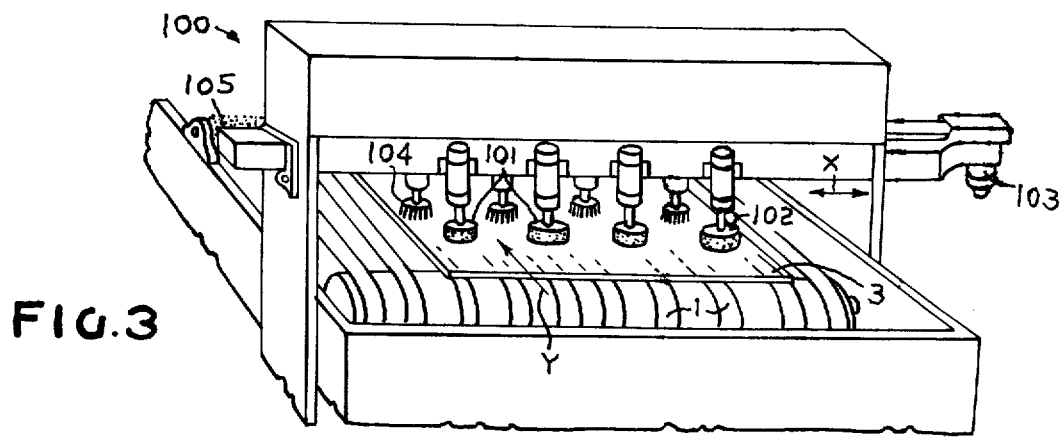
FIG. 3 is a diagrammatic partial perspective view of a glass loading and cleaning section of the apparatus of FIG. 1.

Referring to the drawings, there is shown one embodiment of an apparatus suitable for coating a monolithic substrate, such as a glass plate, with a transparent metal and boron containing film of superior uniformity of film appearance in accordance with the present invention. As shown, the apparatus comprises five basic units or sections, which are designated a glass loading and cleaning section (section 100), a glass sensitizing and activating section (section 200), a metal-boron coating composition deposition section (section 300), a glass drying section (section 400) and a film density measuring and glass unloading section (section 500). The apparatus also comprises a conveyor means including a plurality of belts 1 in section 100 and rollers 2 in sections 200, 300, 400 and 500 for carrying and advancing glass plates 3 (FIGS. 1 to 7) past the various sections 100 to 500 in the directions illustrated by the arrows Y. As explained below, the belts 1 and the rollers 2 are rotated by conventional means (not shown) so as to advance the plates 3 at a rate of from about 0.5 to about 7 feet per minute, and preferably from about 3 to about 6 feet per minute.

During continuous operation a plurality of glass plates 3 are loaded onto the belts 1, so that the belts advance the plates into and through section 100 of the apparatus. Referring to FIGS. 1, 2 and 3, a plurality of rotating discs or blocks 101 gently abrade the uppermost surface of each plate, preferably with a mixture of cerium oxide or red rouge and water, to loosen and remove any dirt therefrom. This blocking operation is preferably carried out with cattle hair felt blocks having a diameter of from about 4 to about 12 inches. Each of the blocks is mounted on a shaft 102 which is rotated by a suitable motor 103 and gear means (not shown) at a rate of from about 200 to about 600 revolutions per minute. In the preferred embodiment, the blocks are rotated at about 300 to about 500 revolutions per minute and are oscillated, for example, a distance of about 2 to 4 inches in a direction transverse to the direction Y of the advancing plate to insure that the entire uppermost surface of the plate is blocked. While still in section 100, each plate advances beneath a plurality of rotary cup brushes 104 that wash the surface of the plate with tap water. The brushes 104 which may have nylon bristles or the like, are generally rotated at the same rate as the blockers 101, and are preferably oscillated in the same manner as well. Each plate finally advances beneath a rotary cylinder brush 105 disposed across the advancing plate. The brush 105 may comprise nylon bristles or the like which contact the plate and complete the cleaning thereof. The brush is generally rotated at about 300 to about 400 revolutions per minute. Both the rotary cup brushes 104 and the rotary cylinder brush 105 may be driven by conventional means such as motors (not shown) that may be similar to the motor 103.

Each plate 3 then enters into and passes through section 200 of the apparatus, wherein the surface thereof is sensitized and then activated. As illustrated in FIGS. 1 and 2, and more particularly in FIG. 4, the plate is rinsed, preferably with demineralized wate, as it enters section 200 to remove any traces of cerium oxide, red rouge, tap water or any other undesirable matter carried over from section 100. In the past, the rinse has been performed by one of several available means. For example, U.S. application Ser. No. 57,451 suggests that the plate may be rinsed by reciprocating a water spray gun transversely of the advancing plate.

According to the present invention, the rinse is performed by an angled crossfire technique. As illustrated schematically in FIGS. 1, 2 and 4, an angled crossfire rinse set 201 comprises a mutually opposed pair of pipes 201A and 201B supported from a carriage 203. The latter reciprocates transversely of the plate 3 on transversely extending, horizontal tracks 204 on the rinse set reciprocating axis X at a rate of between about 25 and 70 single passes per minute, and preferably between about 45 and 60 single passes per minute. The carriage 203 is driven by a chain or belt 205 that runs over a pair of pulleys 206 and 207 arranged at the opposite ends of the track 204. A motor 208 drives the chain 205 while a connection 205A between the chain and the carriage slides up and down in a vertical groove 205B on the carriage as the connection moves around the pulleys. The drive construction is similar to that shown in Bramsen et al, U.S. Pat. No. 2,246,502. During the reciprocating motion of the carriage 203, demineralized water is fed alternately to the pipes 201A and 201B in such a program that water is sprayed only from nozzles 201A', 201A'' and 201A''' when the carriage is moving from left to right in FIG. 4, and only from nozzles 201B', 201B'' and 201B''' when the carriage is moving in the opposite direction. The pipes 201A and 201B may be supplied with water through lines 209 and 210, respectively, by any suitable means. The pipes are advantageously operated at pressures between about 25 to 80 pounds per square inch, preferably between about 25 and 45 pounds per square inch, and at flow rates of about 500 to about 600 milliliters per minute per pipe.

Referring to FIG. 11, there is shown a perspective view showing the details of the angled crossfire rinse apparatus according to the present invention. FIG. 11 shows a rinse set 301 comprising pipes 301A and 301B with nozzles 301A', 301A'' and 301A''', and 301B', 301B'' and 301B''', respectively, and a spray gun set 302, comprising a nozzle 302A for dispensing a metal-containing solution and an opposed nozzle 302B for simultaneously dispensing a reducing solution. Rinse set 301 is identical to all of the other rinse sets disclosed herein, including set 201. Rinse water is applied to the glass surface, first by the nozzles 301A', 301A'' and 301A''' as the rinse set 301 reciprocates along the rinse set reciprocating path X toward a first side of the glass piece (shown in FIG. 11), and then, by nozzles 301B', 301B'' and 301B''' as rinse set 301 travels along the rinse set reciprocating axis X toward the other side of the glass piece reciprocating axis X toward the other side of the glass piece (not shown). In each case, the nozzles discharge rinse water obliquely downward, rearward and outward, and rinse water is swept off of the side and the trailing edge of the sheet, rather than being delivered into the spray area or accumulated along its trailing edge portion. This leaves a uniform water film beneath spray gun set 302 and this is most desirable in order to obtain a uniform metal-boron coating.

There are many commercially available control means to alternate the flow between pipe 301A and pipe 301B. Valves $V_1$ and $V_2$ are illustrated as an example of suitable control means, either automatic or manual, that become apparent to one skilled in the art.

FIG. 12 is a top view of the rinse set of FIG. 11 illustrating an important feature of the preferred embodiment of the present invention. The fan-shaped spray W from each rinse nozzle, as viewed in the top view, extends for an angle S of about 50° to about 75°, and preferably about 60°. The pipes 301A and 301B are positioned symmetrically about article movement path Y so that the angle formed between the pipes of each set is between about 15° and about 100°, and preferably between about 30° and about 60°. The nozzles extend perpendicularly from each pipe so that there is preferably an angle A ranging from about 105° to about 120° formed between the axis of the article movement path Y in the direction of article movment and each nozzle axis N in the direction of water flow subtended on the horizontal plane of the article movement path axis Y.

If angle A is larger than the preferred range and spray-fan angle S remains constant, there is insufficient sideward component of water flow toward the glass side edges and too much rinse water remains on the glass surface when the latter is delivered into the spray area. If angle A is smaller than the preferred range and angle S remains constant, there is insufficient rearward component of water flow toward the trailing edge of the glass and a heavy build-up of liquids at the trailing edge of the plate results. In any case, it is important to note that the size of angle A should be directly related to the size of angle S. For example, if angle A is 120° and angle S is 60°, there will be no component of motion of the spray from spray-fan W extending in the positive Y direction of glass movement toward spray-fan M (see FIG. 11). This orientation eliminates puddles of rinse water in the spraying area. However, if one increases angle S, angle A must also be increased to insure that little, and preferably no component of motion of the spray from spray-fan W is directed towards spray-fan M. To state it another way, angle A must be at least 90° plus approximately one-half of angle S to insure that any flow of rinsing medium directed toward the spary gun set is minimized and preferably eliminated.

The intensity of spray W is generally not as great at the edges as it is at the center of the spray. This possibly explains why the final coating is not damaged when approximately 10° or 15° of spray W is directed toward spray M.

It is also noted that the nozzles in each set dispense rinse water simultaneously in paths parallel to one another from origins disposed obliquely rearward and at a greater distance from the side edge approached by the pipe during the portion of its reciprocation cycle that it dispenses rinse water. This arrangement enables each successive obliquely rearward nozzle to reinforce the sweeping action of the rinse water both in a sideward and a rearward direction. This feature reduces the likelihood of stagnant pools of excess water remaining on the upper surface of the treated articles.

Referring to FIG. 13, there is shown a partial end view of the rinse set, illustrating nozzles 301A' and 301B'. This figure points out another important feature of the preferred embodiment of the present invention. The rinse nozzles should be installed so that they are offset from the vertical axis by about 35° to about 50°. If the rinse nozzle is orientated at an angle less than 35°, it is possible to damage a previously applied sensitization layer or activation layer, or even a coating layer, due to the stronger impact of the rinse. In addition, if the rinse nozzle is orientated at an angle less than 35° with the vertical, the desired sweeping action is minimized. If this angle becomes too large (greater than about 50°), the rinse becomes more superficial and less effective.

After undergoing an initial rinse with demineralized water, the plate advances beneath a reciprocating gun 211 (see FIG. 4) which sprays a dilute solution of stannous chloride on the clean surface. The stannous chloride solution may comprise any of the formulations known in the art as being capable of sensitizing nonconductive substrates to metal deposition. However, a preferred formulation comprises from about 0.02 to about 1.0 gram of stannous chloride per liter of solution, together with a small amount of hydrochloric acid. Such a solution may be prepared, for example, by mixing about 20 grams of stannous chloride and 2 to 3 milliliters of concentrated hydrochloric acid (12 N) in enough demineralized water to form one gallon of stock concentrate, and then diluting each part of the concentrate with about 19 parts of demineralized water. In a preferred embodiment, about one part of the above-described concentrate is injected into a stream comprising about 19 parts of demineralized water, whereafter the combined stream is mixed with air at about 60 to about 80 pounds per square inch, and sprayed through the gun 211 in a highly atomized state at a rate of about 500 to about 700 milliliters per minute.

Figure 4:
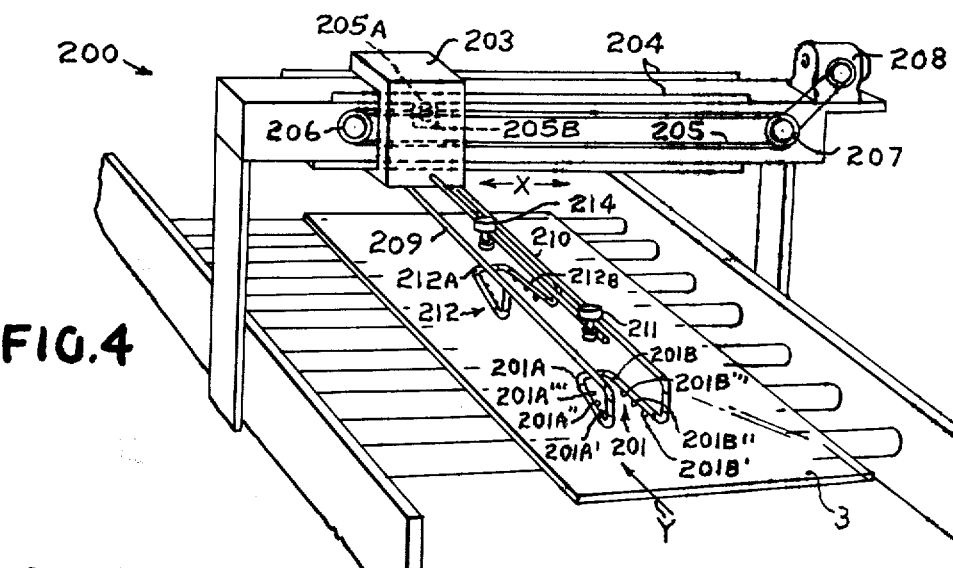
FIG. 4 is a diagrammatic partial perspective view of a sensitizing and activating section of the apparatus of FIG. 1.

As illustrated in FIG. 4, the stannous chloride composition dispensing spray gun 211 is supported from the same reciprocating carriage 203 that supports the initial rinse set 201. In addition, an intermediate rinse set 212 comprising pipes 212A and 212B and a palladium chloride composition dispensing spray gun 214 may also be supported from carriage 203.

As the plate 3 continues to advance, it passes under the intermediate or second angled crossfire rinse set 212 having pipes 212A and 212B with nozzles that operate similarly to those described above in connection with gun set 201.

The sheet 3 then passes under the gun 214 which sprays an atomized mixture of air and dilute palladium chloride on the now sensitized surface so as to activate (or super-sensitize) the surface for the ensuing metal-boron deposition. As is the case with the stannous chloride solution, the palladium chloride may comprise any of the well-known formulations that are suitable for activating a previously sensitized substrate. However, a formulation comprising from about 0.005 to about 1.0 gram of palladium chloride per liter of solution, together with a small amount of hydrochloric acid, is preferred. One such formulation may be prepared by mixing about 2 grams of palladium chloride and 2 to 3 milliliters of concentrated hydrochloric acid with a sufficient amount of demineralized water to form one gallon of concentrated stock solution, and then diluting each part of the stock solution with 19 parts of demineralized water. As is the case with the stannous chloride solution, the diluted palladium chloride is preferably mixed with air at a pressure of about 60 to 80 pounds per square inch and sprayed onto the glass at a rate of about 500 to 700 milliliters per minute.

The spacing between a spray gun and a subsequent rinse set in section 200 may vary within wide limits depending, for example, upon the rate at which the plate is advancing, the dimensions of the fan-shaped spray pattern generated by each nozzle, the rate of traverse of each gun, and the like. However, it is preferable to arrange the various rinse sets and guns in section 200 such that the time required for the leading edge of a given plate 3 to advance from each spray gun to the next successive rinse gun set is from about 10 to about 90 seconds. In addition, as described more fully below, it is preferred that each angled crossfire spray rinse set be spaced from its respective spray gun so that the edges of the spray from the rinse set slightly overlap the edges of the spray from the spray gun.

As illustrated, the plate then passes from section 200 of the apparatus to section 300 thereof, wherein a metal and boron-containing coating, preferably nickel-boron, cobalt-boron, iron-boron or a mixture of at least two of said metal-boron coatings is deposited on the now activated surface thereof. The deposition is preferably accomplished by simultaneously spraying and intermixing a metal-containing solution and a boron-containing reducing solution onto the activated surface such that the metal ions present in the contemplated metal solution become reduced to a transparent boron-containing metal film which tenaciously adheres to the activated surface.

It will be appreciated that the number, disposition, and the spacing of the guns which spray the metal solution and the boron-containing reducing solution, and the rate at which they are reciprocated, are determined generally by the rate at which the plate advances, the temperature, pH, and concentration of the intermixed film forming composition and the like, and primarily by the time required for the film forming composition to be substantially depleted in its film forming capacity, and the desired thickness and transparency of the deposited film. The importance of these latter two parameters will become more apparent in view of the illustrative example set forth below.

Figure 5:
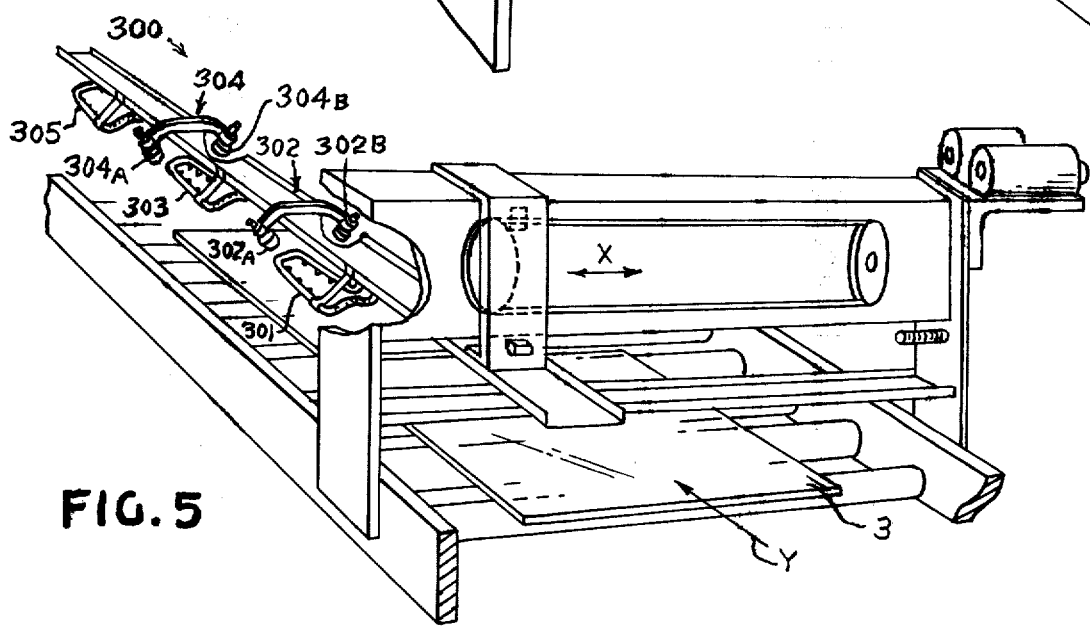
FIG. 5 is a diagrammatic partial perspective view of a metal-boron deposition section of the apparatus of FIG. 1.

For the sake of illustration, section 300 is shown in FIGS. 1, 2 and 5 as having two spray gun sets 302 and 304, each comprising a first nozzle for dispensing a metal-containing solution, 302A and 304A, respectively, and an opposed second nozzle, 302B and 304B; respectively, for dispensing a reducing solution. Section 300 also includes three identical angled crossfire rinse sets 301, 303 and 305, as described hereinabove. As shown, the spray gun sets 302 and 304 are supported for transverse reciprocating movement, for example, in the manner described for reciprocating spray guns 211 and 214 in connection with FIG. 4. However, it should be noted that the gun sets in section 300 must reciprocate much faster than those in section 200 or than those employed in conventional spray techniques for depositing silver, for example. In this connection, it has been found that uniformly and controllably transparent metal-boron coatings can best be made in accordance with the present invention only when the gun sets in section 300 are reciprocated at a rate of at least about 60 to 65 single passes per minute, and preferably from about 72 to about 76 single passes per minute, when the plates being coated are about 4 feet wide and are advanced at a rate of from about 3 to about 6 feet per minute. Thus, for a 4-foot wide plate advanced at a rate of 3½ feet per minute, i.e., 42 inches per minute, a gun set reciprocating at 74 single passes per minute will complete about 1.75 single passes over each inch segment of the advancing plate. Accordingly, if the width of the applied spray in a direction of travel of the plate is from 10 to 12 inches, each inch segment of the plate will receive from about 17.5 to about 21.1 applications of solution per gun set. Of course, the required number of passes per minute will vary somewhat in accordance with changes in magnitude of the various parameters discussed herein. For example, the required number of passes would increase when the plates being coated are advanced more rapidly than about 3 to about 6 feet per minute.

The spray guns of each set 302 and 304 are connected through respective supply lines (not shown) to air under pressure at about 20 to about 60 pounds per square inch. In turn, the respective supply lines are in fluid communication with prepared metal and reducing solutions stored in separate solution tanks or containers (not shown), preferably of such size to hold a reasonable supply of fluid, such that when the prepared solutions are injected into the supply lines by any conventional means (not shown), the solutions are fed through the lines and sprayed from the guns in a fan-shaped pattern. It will be appreciated that the magnitude of air pressure required for a satisfactory spraying varies considerably with the design of the guns and the various parameters of the solutions employed. In this connection, satisfactory results have been obtained with pressures as low as about 20 pounds per square inch and as high as about 55 pounds per square inch. Pressures in the range of about 25 to about 40 pounds per square inch are preferred. The rates at which the respective prepared solutions are sprayed from each gun may vary, but it is preferred that the rates of flow be maintained at about 300 to about 2000 milliliters per minute per gun.

As illustrated in FIGS. 8, 9 and 10, each of the guns 302A and 302B in the metal depositing spray gun set 302 is preferably designed to provide a substantially fan-shaped stream which opens only a few degrees in the direction transverse to the advancing plate, and which opens in the direction of travel of the plate such that the stream contacts the advancing plate in an elliptical pattern having a major diameter of from about 8 inches to about 14 inches, and preferably from about 10 inches to about 12 inches in length (FIG. 8). Spray gun set 304 functions in the same manner.

The guns in each metal salt-reducing solution set are arranged to have an included angle of from about 80° to about 120° between the stream of composition they dispense. To accomplish this end, each of the metal salt solution dispensing guns is inclined obliquely from the vertical about 40° to about 60° toward a mutually opposed reducing solution dispensing gun, and vice versa in a vertical plane common to the dispensing guns of the set (FIG. 10). This arrangement is desirable so that the metal and reducing solutions are effectively and thoroughly mixed as they approach and strike the surface of the activated glass plate.

Referring again to FIG. 11, there is shown a detailed perspective view of the angled crossfire rinse set 301 and the spray gun set 302. FIG. 11 shows another important feature of the preferred embodiment of the present invention, i.e., the spray M from spray gun set 302 overlaps the spray W from the last nozzle of the angled crossfire rinse set 301 by about one-eighth or about one-fourth of an inch at the upper glass surface. Ideally, the edge of spray M should just touch the edge of spray W to prevent backflow and therefore puddling of the rinsing medium beneath spray M, but since it is not practical to adjust the extent of sprays M and W with precision, and, since it is detrimental for the sprays to be spaced (for reasons stated below), they are slightly overlapped.

In the past, spray rinses have been used to keep the glass surface clean prior to either a sensitization spray or a coating spray. The angled crossfire rinse set of the present invention performs this function at least as well as any prior-art rinse apparatus. In addition, the angled crossfire rinse set serves to insure that there is a uniform water film on the glass surface, immediately upstream of the rinse set, where it is sprayed with either a sensitizing composition or a coating composition. In practice, the water thickness should be maintained at about 0.05 inch, and preferably between about 0.03 inch and about 0.10 inch, for the metal-boron coating to adhere tenaciously to the glass surface. It is most important, however, that the water film be uniform in thickness, and the angled crossfire rinse set of the present invention insures that a uniform thickness is obtained.

If the rinse set spray W is spaced from the metal-boron spray M (or from the sensitizer spray), the water from the rinse set circles back to the metal-boron spraying area (or to the sensitizer spray area) and an uneven coating can result. If the spray from the rinse set overlaps the spray from the metal-boron gun by more than about one-fourth of an inch, a non-uniform coating can result due to the fact that a considerable portion of the spraying area is agitated while it is being sprayed.

As the plate advances beyond each spray gun set 302 and 304, the intermixed film forming composition which is uniformly distributed on the surface of the plate is permitted to rest relatively quietly. This quiescent period or period of minimum turbulence is highly desirable since it enables the film forming composition to deposit a transparent coating which is substantially free from visual defects normally attributed to turbulance or agitating of the filming composition during deposition. In addition, it is during this quiescent period that the intermixed filming compositions contemplated herein undergo a change in their capacity for depositing a film such that the rate of film deposition, which is initially relatively rapid, decreases and then effectively completely ceases while the deposited film is still transparent. While the time required for this change in filming capacity to occur will vary considerably depending upon the chemistry of the actual filming composition employed, a filming composition comprising equal amounts of the nickel acetate solution and borohydride reducing solution, illustrated respectively in Tables I and II of U.S. Patent application Ser. No. 57,451, will normally undergo a substantial decrease in its filming capacity within from about 10 seconds to a few minutes, e.g. 5 minutes. In this regard, a glass plate that is coated with a metal and boron-containing film at room temperature by a single 15-second spray application of the above illustrated intermixing filming composition will normally have a luminous transmission of from about 30 to about 40 percent when the filming capacity of the composition has depleted and filming has effectively ceased.

Referring once again to FIGS. 1 and 5, it will be appreciated that once the film forming composition has become dead, i.e., depleted of its filming capacity, it may be removed from the plate by any convenient means without affecting the thickness, and thus the transparency of the film. It will also be appreciated that the lowest degree of transparency obtainable will depend primarily upon the amount of film that will deposit from a given film forming composition before it becomes dead, the number of gun sets in section 300, and the distance between each gun set. The effect of these variables on the thickness, uniformity and transparency of metal-boron films formed in accordance with this invention will be more fully appreciated in light of the example recited hereinbelow.

After undergoing the quiescent period after its exposure to the mixed composition dispensed by spray gun set 304, the plate has a luminous transmittance of about 15 to 25 percent. If a third spray gun set is used (not illustrated), a luminous transmittance of about 10 percent is obtained. Each additional gun provides a quiescent period designed to allow the partially formed metal-boron film to increase in thickness uniformly in the substantial absence of adverse effects caused by turbulence. Even more important, however, this period is designed to allow sufficient time for the film forming composition on the surface of the plate to become substantially depleted of its film-forming capacity so that the rate of deposition of the metal-boron film will have materially slowed down, and preferably effectively ceased, before the plate is rinsed under set 305. In this latter connection, it will be appreciated that the necessary distance between the rinse set 305 and the last metal depositing gun set 304 is related to the rate at which the plate is advanced. Thus, when maintaining all of the various parameters within the bounds described herein, the distance between the final rinse set 305 and the last spray gun set 304 should be at least about 30 inches, and preferably at least about 35 to 40 inches to provide a final thickness corresponding to a luminous transmittance of about 20 percent.

After undergoing a final water rinse under set 305, the plate advances into section 400 of the coating apparatus where it is dried by means of a suitable air knife 401 (FIG. 6). The air knife 401 may comprise any conventional blow-off device, but it is preferred to employ a high volume-low pressure knife to avoid disturbing the quality of the metal-born film. For example, it is desirable to employ a knife that operates at a pressure of about 3 to 7 ounces per square inch, while forcing from about 300 to about 400 cubic feet of air per minute against the metal-boron coated glass plate.

After passing beneath the air knife, the coated plate passes into section 500 where the thickness of the deposited film is measured by a conventional measuring device 501. Thereafter, the transparent glass plate is removed from the rollers 2 and is ready for use.

The present invention is applicable in forming transparent metal-boron films on clear plastic (e.g. polymethyl methacrylate) and glasses, especially soda-lime-silica glasses, but can be used to film a wide variety of glass, ceramic, glass-ceramic, siliceous and calcareous based compositions. For example, this invention can be used to provide metal-boron and particularly nickel-boron films on the following types of glasses: soda-lime-silica glasses; alkali-alumina-silica glasses, such as those containing lithia as a component alkali; alkali-zirconia-silica glasses; alkali-alumina-zirconia-silica glasses; borosilicate glasses, etc. Bearing this in mind, the present invention is described hereinbelow with specific reference to soda-lime-silica glass.

The soda-lime-silica glass to be treated can be a clear glass or it can be a colored glass tinted by the introduction of various conventional materials into the glass forming batch. These latter glasses are often referred to as heat absorbing glasses especially when they contain iron oxide. Representative soda-lime-silica glass bases which can be treated in accordance with this invention usually contain 65 to 75 percent by weight $SiO_2$, 10 to 18 percent by weight $Na_2O$, 5 to 15 percent by weight CaO, 1 to 5 percent by weight MgO, 0 to 1.0 percent by weight $Na_2SO_4$, 0 to 5 percent by weight aluminum oxide ($Al_2O_3$), 0 to 8 percent by weight $K_2O$, 0 to 8 percent by weight $B_2O_3$, 0 to 1 percent by weight iron oxide ($Fe_2O_3$), and 0 to 0.7 percent by weight of NaCl, $SO_3$, $As_2O_5$, BaO, NiO, CoO and Se and combinations thereof.

A representative range of composition for soda-lime-silica glasses is listed as follows (wherein the given amounts of metals listed are determined as their oxides, except as otherwise noted):

| Component | Percent by Weight |
|---|---|
| $SiO_2$ | 68 – 73.5 |
| $Na_2O$ | 12 – 17 |
| CaO | 7 – 12 |
| MgO | 2 – 4 |
| $Na_2SO_4$ | 0 – 0.8 |
| NaCl | 0 – 0.3 |
| $Fe_2O_3$ | 0.05 – 0.09 |
| $Al_2O_3$ | 0 – 3.5 |
| $B_2O_3$ | 0 – 6 |
| $K_2O$ | 0 – 1.5 |
| $As_2O_5$ | 0 – 0.5 |
| BaO | 0 – 0.7 |
| NiO | 0 – 0.1 |
| CoO | 0 – 0.1 |
| $SO_3$ | 0 – 0.5 |
| Se | 0 – 0.1 |

This invention will be further understood from the specific example which follows. It should be noted, however, that the present invention is not necessarily limited to specific materials, temperatures, contact times and pH values noted in the below example.

EXAMPLE

A 40 inch × 40 inch × ¼ inch commercial soda-lime-silica glass plate is coated with a nickel-boron film with the apparatus illustrated schematically in FIG. 1. Four blockers are used, each comprising a 3-inch thick cattle hair felt disc of 8-inch diameter. The blockers are arranged at 12-inch centers in the direction parallel to the rollers, hereafter referred to as the transverse direction, and are rotated at about 350 revolutions per minute. The blockers are oscillated about 4 inches in the transverse direction at a frequency of about 15 cycles per minutes. Four 6-inch diameter rotary cup brushes are arranged at 12-inch centers in a transverse direction such that the longitudinal distance between the blockers and the rotary cup brushes is about 9 inches. The rotary cup brushes are equipped with number 12 nylon bristles and are rotated at about 350 revolutions per minute. The brushes are also oscillated about 4 inches in the transverse direction at a frequency of 15 cycles per minute. During operation, the blockers are supplied with a mixture of cerium oxide and tap water, while a spray of tap water is applied beneath the rotary cup brushes. The rotary cylinder brush has a 6-inch diameter, comprising number 12 nylon bristles, and has its axis disposed 8 inches from the rotary cup brushes. The first and second angled crossfire rinse sets, as well as the tin composition dispensing gun and the palladium composition dispensing gun, i.e., all of the rinse sets and the guns in section 200, are mounted from a single boom that reciprocates in a transverse direction at a rate of about 45 single passes per minute. Each of the rinse nozzles comprises a single UniJet-T8002 spray nozzle (manufactured by Spraying Systems Company, Dellwood, Ill.) and is operated at a pressure of about 40 pounds per square inch, at an average flow rate of about 0.2 gallon of demineralized water per minute. Each of the tin and palladium composition dispensing guns comprises a single, type C, spray gun equipped with a Paasche U2, F2-8 nozzle, manufactured by Paasche Air Brush Company, Chicago, Ill., and operated at an air pressure of about 70 pounds per square inch and a flow rate of about 500 milliliters of the solution described below per minute. The distance between the rotary cylinder brush and the first crossfire rinse set 201 is about 30 feet while the distance from each gun to the next respective gun is about 5 feet.

Angled crossfire rinse set 301 in section 300 is approximately 7 inches from spray gun 302. In addition, gun set 302 is spaced approximately 63 inches from gun set 304. The distance between the tip of the nickel solution dispensing gun and the tip of the reducing solution dispensing gun is about 10 inches. All of the spray guns in section 300 employ Paasche U2, F2-8 nozzles, which are arranged so that the tip of each nozzle is about 7 inches above the surface of the glass being coated, and so that each respective gun set generates a fan-shaped stream of intermixed film forming solution that contacts the glass surface in a generally elliptical pattern having a major diameter of 11 inches extending in the longitudinal direction. All of the rinse sets and the guns in section 300 are mounted from a single boom that reciprocates in the transverse direction at a rate of about 72 passes per minute which is equal to 36 round trips per minute. During operation, each of the metal deposition gun sets in section 300 is maintained at a pressure of about 40 pounds per square inch and a flow rate of about 800 milliliters of solutions per minute, while the final crossfire rinse gun 305 is operated at a pressure of about 40 pounds per square inch at an average flow rate of about 0.2 gallon of demineralized water per minute per nozzle. The distance between set 305 and the last metal depositing gun set 304 is about 70 inches.

The air knife 401 comprises an elongated metal housing having a 0.002-inch wide delivery slot extending along the length of its bottom wall. The knife 401 is disposed at a 45° angle relative to the advancing plate and had its centermost portion spaced about 8 feet from the final rinse set 305. The air knife is operated at about 5 ounces per square inch and at a flow rate of about 350 cubic feet per minute. The ambient air temperature is about 82° F, while the temperature of the demineralized and tap water used throughout this example is about 63° F. The glass plate is advanced at a rate of about 5 feet per minute, while the slot opening of the air knife is spaced about one-half inch from the plate. On the basis of a liter of solution, each of the prepared aqueous solutions employed has the following composition:

Nickel Solution

| Nickelous acetate | 5 grams |
| Boric acid | 2.5 grams |
| Sodium gluconate | 9.0 grams |
| Hydrazine sulfate | 0.5 gram |
| Water | Added to 1 liter |
| Ammonium hydroxide | Added to pH 7.4 |
| Ethomeen C-20* | 0.06 gram |

* Ethomeen C-20 (trademark of Armour and Company) is a cocoamine having an average molecular weight of 645 and the following generalized formula:

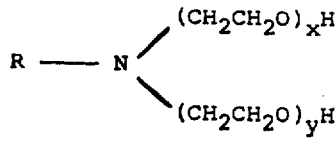

wherein R is derived from a cocoamine and x + y = 10.

| Reducing Solution | |
|---|---|
| Sodium borohydride | 0.5 gram |
| Water | Added to 1 liter |
| Sodium hydroxide | Added to pH 11.6 |
| Ethomeen C-20 | 0.30 gram |

| Tin Solution | |
|---|---|
| Stannous chloride | 0.2 gram |
| Hydrochloric acid (12 N) | 0.04 milliliter |
| Water | Added to 1 liter |

| Palladium Solution | |
|---|---|
| Palladious chloride | 0.02 gram |
| Hydrochloric acid (12 N) | 0.04 milliliter |
| Water | Added to 1 liter |

The temperature of each of these solutions is about 70° F. The pH of the intermixed nickel and borohydride solutions is about 7.7. A nickel film is formed which contains 5 to 10 percent by weight boron and the resulting coated plate has a luminous transmission of about 22 percent. The film is very adherent to the glass plate and is very uniform in appearance. It has an initial resistivity of 300 ohms per square.

The procedure is utilized to prepare several examples. The results were very reproducible. Uniform films of a desired light transmission can be produced in continuous fashion.

The invention disclosed and illustrated shows an angled crossfire rinse set immediately before each spray gun set, but it should be understood that this has been done for illustrative purposes only an, in actuality, improved results are obtained when an angled crossfire rinse set, as described, is used preceding any of the spray operations. It is most important that the angled crossfire rinse gun set be used before the metal-boron spray because the uniformity of the thickness of the coating provided by this spray is most critical to the uniformity of the transparency of the finished product.

While the invention has been described for use in the application of a metal-boron coating on a glass substrate, its use should not be limited to such. The angled crossfire rinse set may be used wherever there is a need to provide a rinsing function on a surface which requires a uniformly thick film of rinsing medium such as water. Each angled crossfire rinse set has been illustrated with six nozzles, but one skilled in the art will appreciate that this number may vary or the number of nozzles to be used may be less than the number provided, depending on the amount of matter to be rinsed from the glass surface and the rate of flow of rinsing medium permitted by the sensitivity of the surface to be rinsed.

The particular arrangement described above including ranges of oblique angles of orienting the rinse nozzles, the rinse pipes and spray guns with respect to the article movement path have been selected to provide maximum effectiveness of the rinse to avoid either the formation of puddles or circling back of rinse water at a rate of application sufficient to drive off excess water from the trailing and side edges of the work piece without harmful effects on the previous coating. It is understood that stronger rinses may be used to rinse less sensitive films without departing from the principles enunciated in the claimed subject matter that follows.

I claim:

1. A method of rinsing the surface of a glass sheet comprising the steps of:
    providing a rinse set having a plurality of fan-shaped sprays of water toward a given substantially horizontal plane wherein each spray has an apex angle S;
    moving the sheet of glass in a first direction along an article movement path in the given substantially horizontal plane beneath the rinse set;
    directing the fan-shaped sprays (1) at a first oblique angle to a first plane perpendicular to the given horizontal plane and parallel to the article movement path wherein the first oblique angle is between about 35° and about 50° and (2) at a second oblique angle to a second plane perpendicular to the given horizontal plane and the first plane wherein the second oblique angle defines an angle A that is measured from the article movement path and is 90° plus one-half of the apex angle S and between about 105° and about 120° to apply a component of motion to the water in the direction of the trailing edge of the moving glass sheet; and
    reciprocating the rinse set along a reciprocating axis that is spaced from and transverse to the article movement path wherein reciprocating the rinse set in a first direction moves the water in a first direction along the surface of the glass sheet and reciprocating the rinse set in a second direction opposite to the first direction moves the water on the surface in a second direction.

2. A method of rinsing a surface of an article, comprising the steps of:
    providing a rinse set having at least one fan-shaped spray having an apex angle S;
    moving the article in a first direction along an article movement path in a given plane;
    directing the at least one fan-shaped spray (1) at a first oblique angle to a first plane perpendicular to the given plane and parallel to the article movement path wherein the first oblique angle is between about 35° and about 50° and (2) at a second oblique angle to a second plane perpendicular to the given plane and the first plane wherein the second oblique angle defines an angle A that is measured from the article movement path and is 90° plus one-half of the apex angle S and between about 105° to about 120°;
    reciprocating the rinse set along a reciprocating path that is spaced from and transverse to the article movement path.

3. An apparatus for rinsing the surface of a glass sheet, comprising:
    a rinse set for applying a plurality of fan-shaped sprays of rinsing medium downward toward a given horizontal plane wherein each of the sprays has an apex angle S;
    means for moving the glass sheet along an article movement path in the given horizontal plane toward said rinse set;
    means for mounting said rinse set to apply each fan-shaped spray (1) at a first oblique angle to a first plane perpendicular to the given horizontal plane and parallel to the article movement path wherein the oblique angle is between about 35° and about 50° and (2) at a second oblique angle to a second plane perpendicular to the given horizontal plane and the first plane wherein the second oblique angle defines an angle A that is measured from the article movement path and is 90° plus one-half of the apex angle S and between about 105° and about 120°; and
    means for reciprocating said rinse set and said mounting means along a reciprocating path that is spaced from the article movement path and transverse to the article movement path.

4. An apparatus for rinsing a surface of an article, comprising:
    a rinse set for applying at least one fan-shaped spray of rinsing medium having an apex angle S;
    means for providing relative movement between the article and said rinse set along an article movement path in a given plane;
    means for mounting said rinse set to apply the fan-shaped spray (1) at a first oblique angle to a first plane that is perpendicular to the given plane and parallel to the article movement path wherein the first oblique angle is between about 35° and about 50° and (2) at a second oblique angle to a second plane that is perpendicular to the given plane and the first plane wherein the second oblique angle defines an angle A that is measured from the article movement path and is 90° plus one-half of the apex angle S and between about 105° and about 120°; and
    means for reciprocating said rinse set and said mounting means along a reciprocating path that is spaced from and transverse to the article movement path.

* * * * *